United States Patent
Kim et al.

(10) Patent No.: US 11,249,686 B2
(45) Date of Patent: Feb. 15, 2022

(54) CONTROLLER FOR HANDLING AN ABORT COMMAND USING A REGENERATION QUEUE AND OPERATION METHOD THEREOF

(71) Applicant: SK hynix Inc., Gyeonggi-do (KR)

(72) Inventors: Kiduck Kim, Gyeonggi-do (KR); Wonkyoo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 53 days.

(21) Appl. No.: 16/900,505

(22) Filed: Jun. 12, 2020

(65) Prior Publication Data

US 2021/0109676 A1    Apr. 15, 2021

(30) Foreign Application Priority Data

Oct. 14, 2019    (KR) .................. 10-2019-0126614

(51) Int. Cl.
*G06F 3/06*    (2006.01)
*G06F 9/48*    (2006.01)

(52) U.S. Cl.
CPC .......... *G06F 3/0659* (2013.01); *G06F 3/0614* (2013.01); *G06F 3/0656* (2013.01); *G06F 3/0673* (2013.01); *G06F 9/4881* (2013.01)

(58) Field of Classification Search
CPC .... G06F 3/0659; G06F 3/0614; G06F 3/0656; G06F 3/0673; G06F 9/4881
See application file for complete search history.

(56) References Cited

U.S. PATENT DOCUMENTS

| | | | |
|---|---|---|---|
| 9,547,556 B1 | 1/2017 | Wong et al. | |
| 9,792,046 B2 | 10/2017 | Desai et al. | |
| 10,635,350 B2* | 4/2020 | Singhal | G06F 3/0679 |
| 2017/0199667 A1* | 7/2017 | Zia | G06F 3/0659 |
| 2018/0341429 A1* | 11/2018 | Bolkhovitin | G06F 3/0659 |

* cited by examiner

*Primary Examiner* — Charles Rones
*Assistant Examiner* — Hewy H Li
(74) *Attorney, Agent, or Firm* — IP & T Group LLP

(57) ABSTRACT

A controller for controlling a memory device includes: a command queue suitable for queuing two or more commands received from a host; a re-generation queue suitable for queuing, in response to an abort command for aborting an abort-target command, a re-generated command corresponding to a remaining command other than the abort-target command among the commands queued in the command queue; a processor suitable for resetting the command queue when queuing a command in the re-generation queue is completed, and queuing the re-generated command into the command queue.

15 Claims, 8 Drawing Sheets

CONTROLLER FOR HANDLING AN ABORT COMMAND USING A REGENERATION QUEUE AND OPERATION METHOD THEREOF

CROSS-REFERENCE TO RELATED APPLICATION

The present application claims priority of Korean Patent Application No. 10-2019-0126614, filed on Oct. 14, 2019, which is incorporated herein by reference in its entirety.

BACKGROUND

1. Field

Various embodiments of the present invention relate to a controller for controlling a memory device.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Embodiments of the present invention are directed to a controller which ensures rapid processing of an abort command for a command queued therein, and a method for operating the controller.

In accordance with an embodiment of the present invention, a controller for controlling a memory device includes: a command queue suitable for queuing two or more commands received from a host; a re-generation queue suitable for queuing, in response to an abort command for aborting an abort-target command, a re-generated command corresponding to a remaining command other than the abort-target command among the commands queued in the command queue; a processor suitable for resetting the command queue when queuing a command in the re-generation queue is completed, and queuing the re-generated command into the command queue.

In accordance with another embodiment of the present invention, a method for operating a controller controlling a memory device includes: queuing two or more commands received from a host in a command queue; queuing, in response to an abort command for aborting an abort-target command, a re-generated command corresponding to a remaining command other than the abort-target command among the commands queued in the command queue; resetting the command queue when queuing a command in the re-generation queue is completed; and queuing the re-generated command into the command queue.

In accordance with another embodiment of the present invention, an operating method of a controller, the operating method includes: queueing first and second commands; generating, in response to an abort command for the second command, a third command including one or more sub-commands of the first command; removing the first and second commands; and controlling a memory device to perform an operation according to the third command.

DETAILED DESCRIPTION

Figure 1:
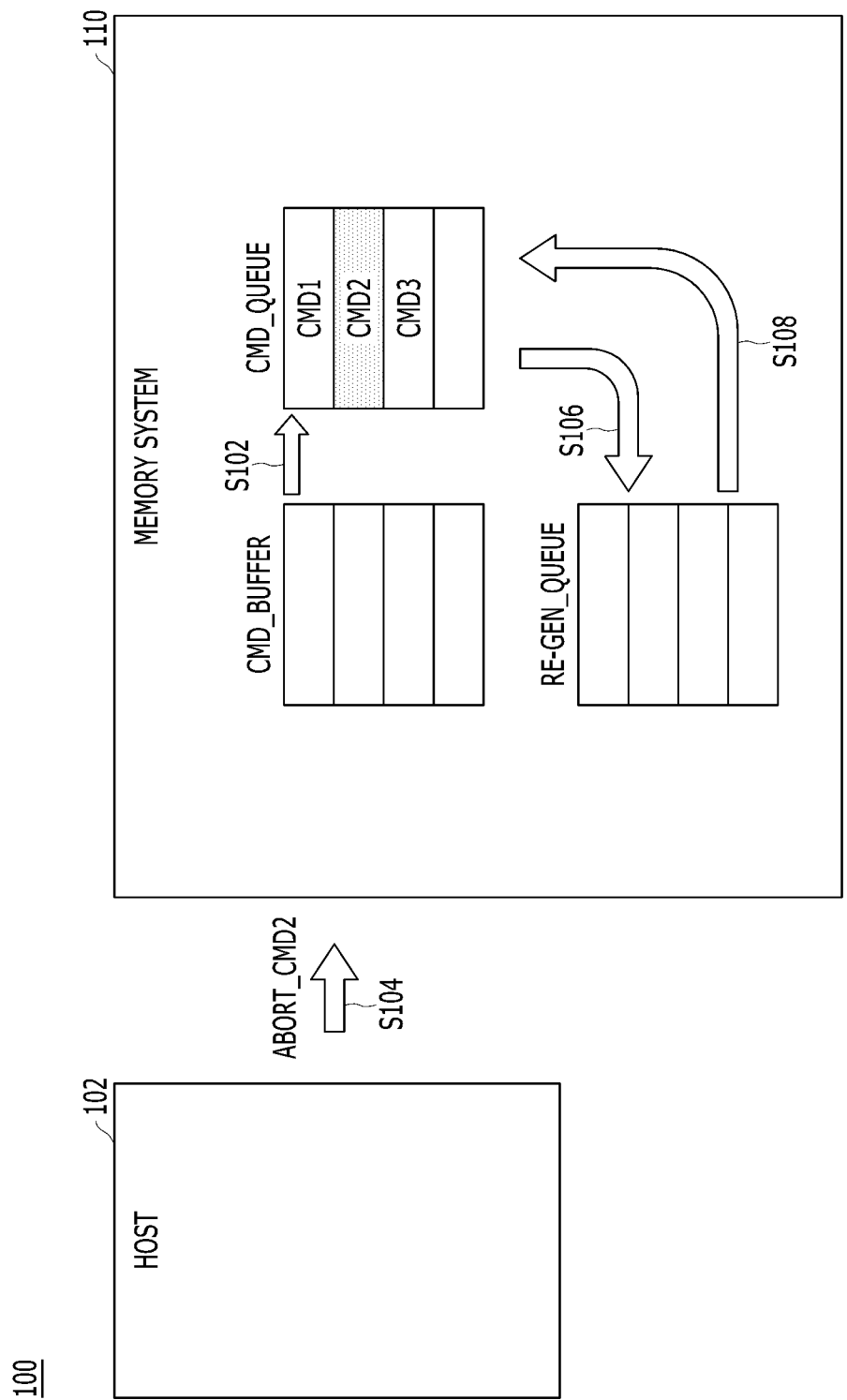
FIG. 1 is a block diagram illustrating a data processing system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete, and fully conveys the scope of the present invention to those skilled in the art. Throughout the disclosure, like reference numerals refer to like parts throughout the various figures and embodiments of the present invention.

Throughout the specification, reference to "an embodiment," "another embodiment" or the like is not necessarily to only one embodiment, and different references to any such phrase are not necessarily to the same embodiment(s). Also, any open-ended transition term, such as "comprising," "including" or the like, when used herein, does not preclude the existence or addition of one or more elements or operations in addition to those stated. Similarly, use of an indefinite article, i.e., "a" or "an," is intended to mean one or more, unless the context clearly indicates that only one is intended.

Hereinafter, embodiments of the present invention are described in more detail with reference to the accompanying drawings.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and/or laptop computer, or any of various non-portable electronic devices such as a desktop computer, a game machine, a television (TV), and/or a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Examples of such storage devices may include, but are not limited to, volatile memory devices such as a dynamic random access memory (DRAM) and/or a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and/or a flash memory. The flash memory may have a 3-dimensional (3D) stack structure.

The host 102 may provide a command to the memory system 110. The host 102 may provide another command to the memory system 110 even before a response to the command already provided to the memory system 110 is received. The memory system 110 may queue the commands received from the host 102 therein and perform command operations in the order that the commands are queued.

The memory system 110 may include a command buffer CMD_BUFFER that receives and buffers commands provided from the host 102. The memory system 110 may include a command queue CMD_QUEUE that queues the commands that are buffered in the command buffer. Step S102 of FIG. 1 represents an operation in which the memory system 110 moves a command buffered in the command buffer to a command queue CMD_QUEUE. FIG. 1 illustrates a state in which the commands previously buffered in the command buffer have been moved to the command queue. As a result, first to third commands CMD1 to CMD3 are queued in the command queue. The memory system 110 may provide a response to the commands that are queued in the command queue to the host 102 and then remove the commands from the command queue.

The commands from the host 102 may include a normal command and an abort command. A normal command may refer to a command that the host 102 instructs the memory system 110 to perform a particular operation. Examples of a normal command include a read command, a write command, and the like. An abort command may refer to a command that the host 102 instructs the memory system 110 to abort one or more normal commands already provided.

The memory system 110 may ensure atomicity for commands provided from the host 102. In other words, the memory system 110 may have to ensure successful processing of a normal command unless an abort command for the normal command is provided.

The processing of a command may mean that the memory system 110 perform an operation instructed by the command. For example, when the memory system 110 provides a response to a write command, all of the write data received from the host 102 in connection with the write command may have to be stored in the memory system 110.

When the memory system 110 receives an abort command for a write command from the host 102 before providing a response to the write command, even though at least a portion of the write data is received from the host 102 associated with the write command, all the received data may have to be removed from the memory system 110.

The memory system 110 may sequentially process the commands that are queued in the command queue according to a first-in-first-out (FIFO) scheme. The memory system 110 may allocate buffer resources to the corresponding commands to buffer data associated with the commands. The memory system 110 may improve operation performance by pre-allocating buffer resources corresponding to a command to be executed in the future as well as to the command that is currently being executed.

The host 102 may abort a command by providing an abort command to the memory system 110 after providing a normal command to the memory system 110 and before receiving a response to the normal command from the memory system 110. Step S104 of FIG. 1 represents an operation in which the host 102 provides the memory system 110 with an abort command ABORT_CMD2 for a second command CMD2 among the commands CMD1 to CMD3 that are queued in the command queue CMD_QUEUE. The shade shown in association with the second command CMD2 of FIG. 1 indicates that the second command CMD2 is an abort target command.

According to an embodiment of the present invention, when the memory system 110 queues a command queued in the command buffer CMD_BUFFER to the command queue CMD_QUEUE, the queuing order may be rearranged according to the priority order of the command. For example, the memory system 110 may arrange the commands in such a manner that the abort command is prioritized over a normal command. ABORT_CMD2 may be processed ahead of the first to third commands that are queued earlier than ABORT_CMD2.

Also, when the memory system 110 removes only the second command from the command queue in response to ABORT_CMD2, the complexity and processing time of ABORT_CMD2 imposed on the memory system 110 may increase.

In order to abort the second command, not only does the second command have to be removed from the command queue, but also the buffer resources allocated for the second command may have to be deallocated from the buffer. For example, the memory system 110 may have to perform an abort operation of examining whether buffer resources for storing data corresponding to the second command are allocated or not and, when the buffer resources are so allocated, marking data in the buffer resources that are already allocated for data corresponding to the second command as dummy data.

In the case of a high-performance memory system 110 using a multi-processor, the process of aborting a command may be very complicated. For example, the memory system 110 may include a host processor and a Flash Translation Layer (FTL) processor. The host processor may receive and queue a command from the host 102 and transfer or receive data associated with the command. The FTL processor may perform an operation corresponding to the queued command. When the host processor and the FTL processor are separated from each other, the memory system 110 may need to control the FTL processor to not perform an operation corresponding to a command aborted by the host processor.

For example, an exclusion process may have to be implemented such that the FTL processor does not perform a command operation associated with the buffer resources marked as dummy data.

Also, when the memory system 110 receives an abort command for a plurality of commands, the abort process may have been performed for each of the commands. Therefore, when the memory system 110 removes only one command (an abort target command) from the command queue in response to the abort command, it is difficult to realize the performance characteristics indicated by the specification of the memory system 110. That is, more time may be taken to abort the command in the memory system 110 than is allowed by the specification of the memory system 110.

According to an embodiment of the present invention, the memory system 110 may move a re-generated command corresponding to a remaining command from the command queue CMD_QUEUE into a re-generation queue RE-GEN_QUEUE and may reset the command queue CMD_QUEUE and the buffer allocation in response to an abort command from the host 102. The remaining command may refer to any command that is not an abort target of the abort command among the commands that are queued in the command queue. FIG. 1 exemplifies that the second command CMD2 is an abort target command and the first and third commands CMD1 and CMD3 are remaining commands. The re-generation queue may be a queue into which the remaining command(s) are moved to complete the processing for the remaining command(s) after resetting the command queue and the buffer allocation. The re-generated command may mean a command that is queued in the re-generation queue based on the remaining command(s). The re-generated command may or may not be the same as any of the remaining commands. The memory system 110 may generate a re-generated command by modifying the remaining command(s) if necessary. Step S106 of FIG. 1 represents an operation of queuing a re-generated command corresponding to the first and third commands CMD1 and CMD3 (i.e., the remaining commands) to the re-generation queue in response to an abort command, e.g., ABORT_CMD2 for the second command CMD2 (i.e., the abort target command).

As a result of the reset operation, all the commands may be temporarily removed from the command queue. After the reset operation is completed, the memory system 110 may queue the re-generated command to the command queue. Step S108 of FIG. 1 represents an operation of queuing a re-generated command corresponding to the first and third commands to the command queue. The memory system 110 may queue the commands of the re-generation queue to the command queue just as in the case of queuing the commands of the command buffer to the command queue. The memory system 110 may process re-generated commands that are queued in the command queue.

According to an embodiment of the present invention, when only some commands are aborted among a plurality of commands queued in the command queue, the remaining commands may be moved to re-generation queue, and the command queue and an allocated buffer resource may be all collectively reset. Therefore, it may take less time for the abort process and less system complexity than in the case where only some commands are removed from the command queue.

Figure 2:
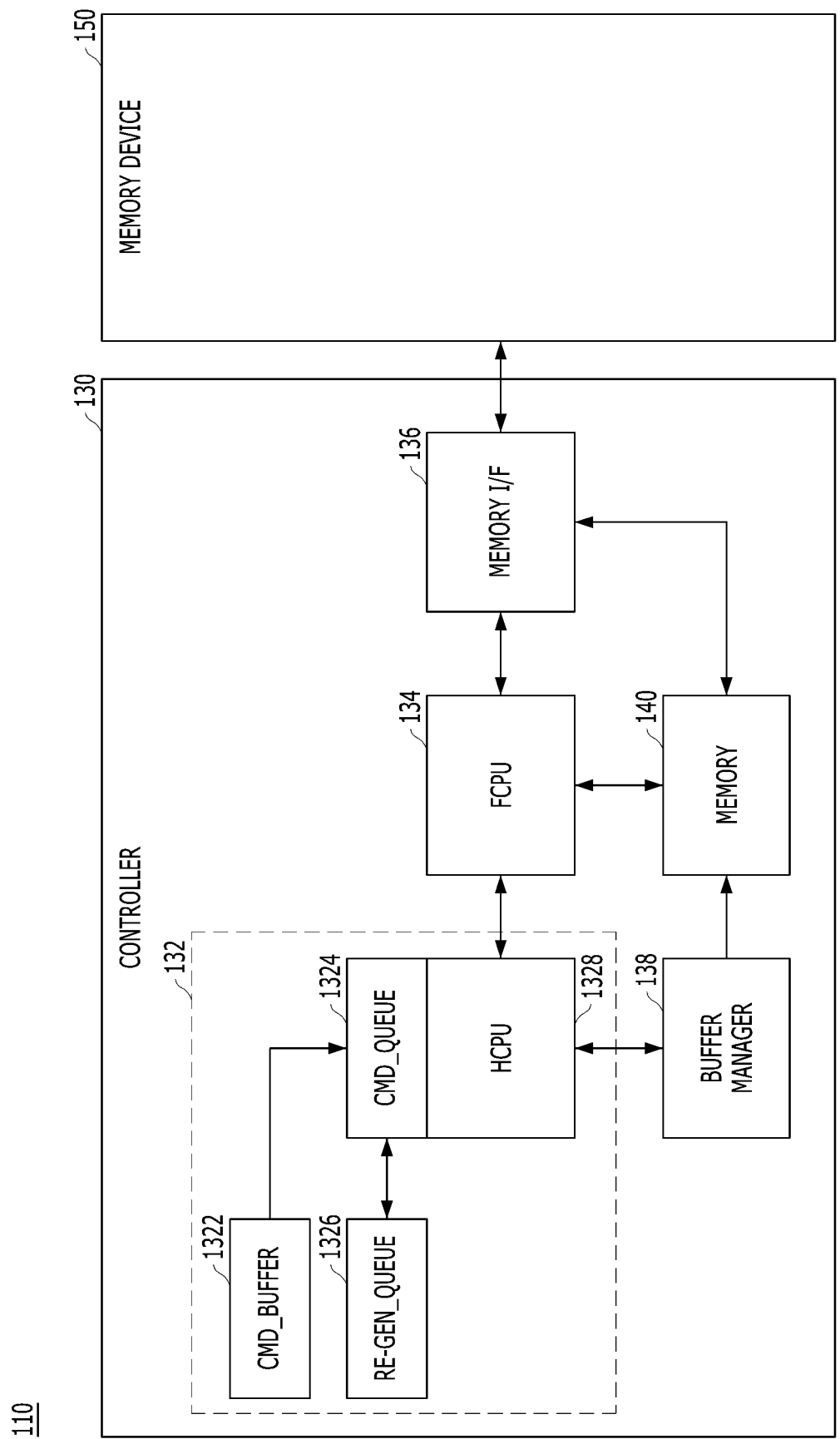
FIG. 2 is a block diagram illustrating a memory system in accordance with an embodiment of the present invention.

FIG. 2 is a block diagram illustrating a memory system 110 in accordance with an embodiment of the present invention.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. In addition, the controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device that retains data stored therein even though power is not supplied. The memory device 150 may store data provided from the host 102 through a program operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, an FTL processor (FCPU) 134, a memory I/F 136, a buffer manager 138, and a memory 140, all operatively coupled via an internal bus.

The host I/F 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and/or integrated drive electronics (IDE).

The host interface 132 may include a command buffer 1322, a command queue 1324, a re-generation queue 1326, and a host processor (HCPU) 1328.

The host processor 1328 may control overall operations of the host 102 and the memory system 110 exchanging commands and data. For example, the host processor 1328 may control the command buffer 1322, the command queue 1324, and the re-generation queue 1326 by driving firmware. The host processor 1328 may control a buffer manager 138 that manages a buffer for temporarily storing data exchanged with the host 102.

When processing of a command received from the host 102 is completed, the host processor 1328 may provide the host 102 with a response corresponding to the command. For example, when all the write data associated with a write command are received from the host 102 in response to the write command, the host processor 1328 may provide a response to the host 102 indicating such receipt. The response to the write command may be provided when the write data are buffered in an internal buffer or when the write data are written in the memory device 150. The host processor 1328 may provide a response to the host 102 after providing all the read data that are read from the memory device 150 to the host 102 in response to a read command. When an abort command is received, the host processor 1328 may abort the abort target command without providing a response to the abort target command.

The command buffer 1322 may correspond to the command buffer CMD_BUFFER described earlier with reference to FIG. 1, and the command buffer 1322 may buffer the commands received from the host 102 and provide a signal to the command queue 1324. According to another embodiment of the present invention, the command buffer 1322 may be realized in hardware.

The command queue 1324 may correspond to the command queue CMD_QUEUE described earlier with reference to FIG. 1. The command queue 1324 may acquire and queue a command that is queued in the command buffer 1322 in response to a signal of the command buffer 1322. The command queue 1324 may provide a command to the FTL processor 134 so that the memory system 110 performs an operation corresponding to the command of the host 102. The command queue 1324 may remove the command when the host processor 1328 provides a response to the queued command to the host 102. Although the command queue 1324 is illustrated as a constituent element separate from the host processor 1328, the command queue 1324 may be realized as part of firmware that is driven by the host processor 1328.

The re-generation queue 1326 may correspond to the re-generation queue RE-GEN_QUEUE described with reference to FIG. 1 and it may queue a re-generated command corresponding to a remaining command in response to an abort command from the host 102. Since the re-generation queue 1326 temporarily holds the re-generated command, the host processor 1328 may simply abort the abort target command by resetting all commands in the command queue 1324 and the allocated buffer resources. When the reset operation is completed, the re-generation queue 1326 may queue the queued re-generated command to the command queue 1324.

The FTL processor 134 may perform a foreground operation in response to the queued command by driving firmware called FTL. For example, the FTL processor 134 may translate a logical address associated with the command into a physical address in response to a command received from the command queue 1324. The FTL processor 134 may generate a command associated with the physical address and provide the generated command to the memory interface 136.

Also, the FTL processor 134 may perform a background operation by driving the FTL. For example, the background operation may be any of a garbage collection (GC) operation, a wear leveling (WL) operation, a map flush operation, a bad block management operation, and the like.

The memory I/F 136 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory I/F 136 may be a flash controller. The memory I/F 136 may be connected to the memory device 150 through a channel including one or more signal lines.

The memory I/F 136 may provide the control signal to the memory device 150 based on the command received from the FTL processor 134. The control signal may include a command and an address for controlling the memory device 150. The memory interface 134 may provide data to the memory device 150 or receive data from the memory device 150.

The memory 140 may serve as a working memory of the memory system 110 and the controller 130, and store data for driving the memory system 110 and the controller 130.

The memory 140 may be embodied by a volatile memory. For example, the memory 140 may be embodied by static random access memory (SRAM) or dynamic random access memory (DRAM). The memory 140 may be disposed within or externally to the controller 130. FIG. 1 exemplifies the memory 140 disposed within the controller 130. In another embodiment, the memory 140 may be embodied by an external volatile memory having a memory interface transferring data between the memory 140 and the controller 130.

The memory 140 may include a program memory, a data buffer, and the like. The program memory may store firmware driven by a processor such as the host processor 1328, the FTL processor 134, or the like. The data buffer may temporarily store write data received from the host 102 and to be written in the memory device 150 and read data read from the memory device 150 and to be transferred to the host 102.

The buffer manager 138 may allocate a data buffer for temporarily storing data associated with the commands queued in the command queue 1324 under the control of the host processor 1328. For example, the buffer manager 138 may divide the data buffer into a plurality of buffer areas and associate each area with an index. The buffer manager 138 may determine how many buffer areas are to be allocated to the command based on the size of the data associated with the command queued in the command queue 1324, and allocate unallocated buffer areas with reference to their indices. The buffer manager 138 may pre-allocate buffer areas not only for a command currently being executed but also for a command to be executed in the future in order to improve the operating performance of the memory system 110.

The host processor 1328 may provide a response to a command queued in the command queue 1324 to the host 102 based on the management information of the buffer manager 138. For example, the host processor 1328 may provide the host 102 with a response that a write process is completed based on the information that all data are stored in the buffer area allocated for the associated write command. Even before the write data are programmed in the memory device 150, the memory system 110 may provide the write data when the host 102 requests for the write data. As another example, the host processor 1328 may provide read data to the host 102 and then provide a response that a read process is completed to the host 102 based on the information that all the data are stored in the buffer area allocated for a read command.

Figure 3A:
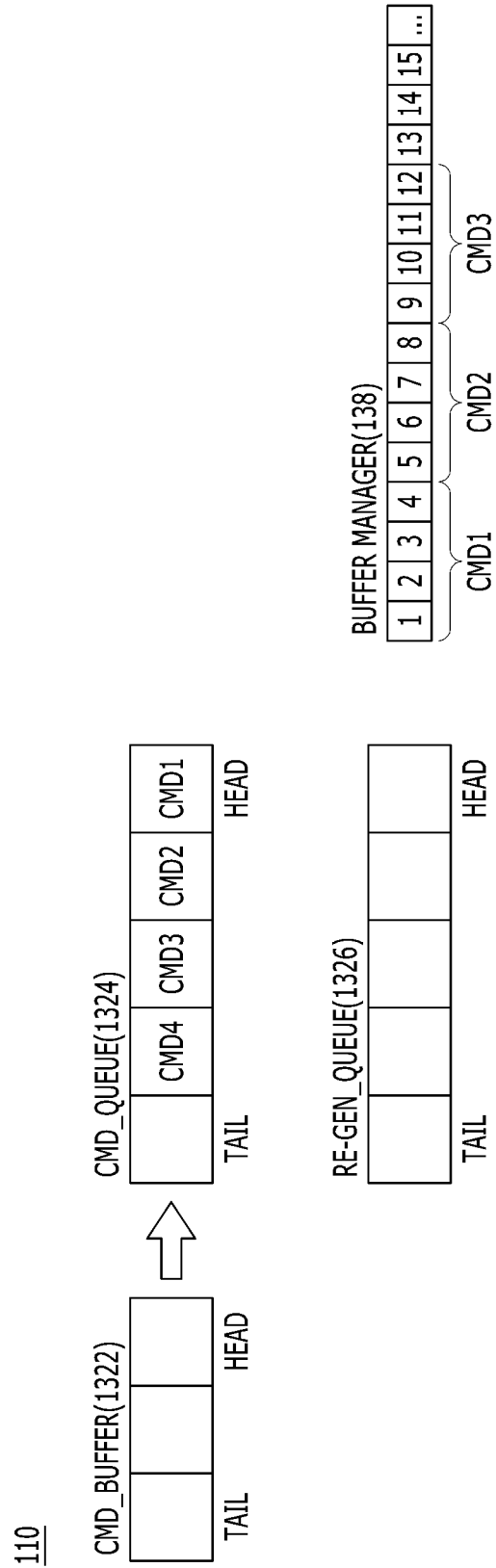
FIGS. 3A to 3E illustrate an operation of the memory system in accordance with an embodiment of the present invention.
Figure 3B:
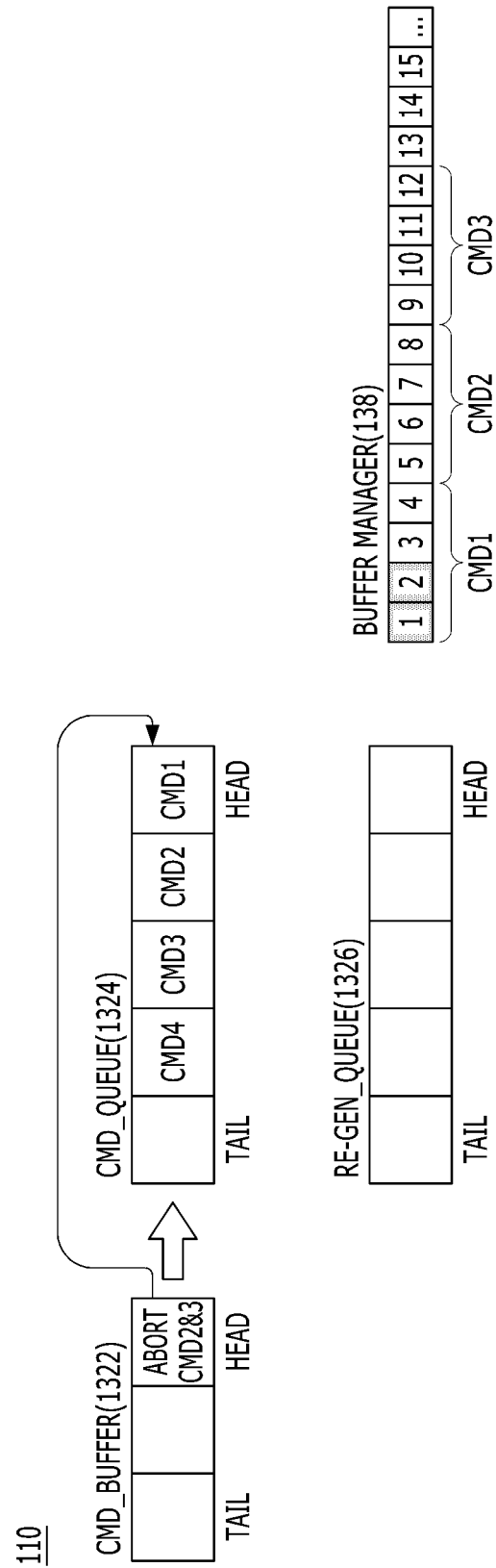
Figure 3C:
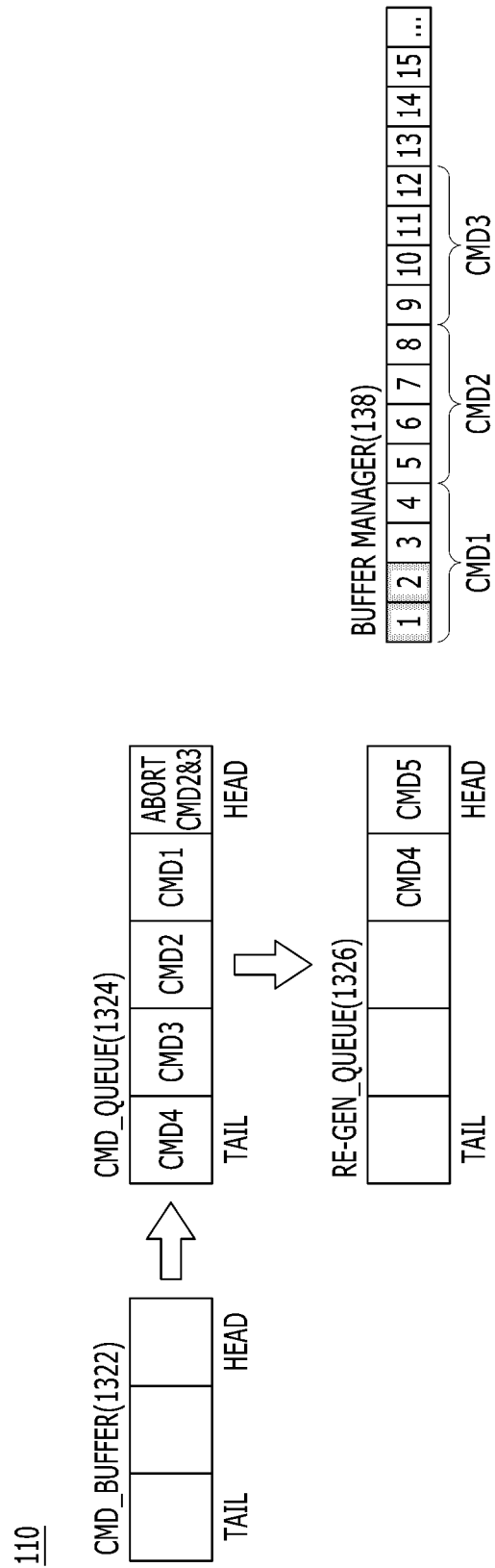
Figure 3D:
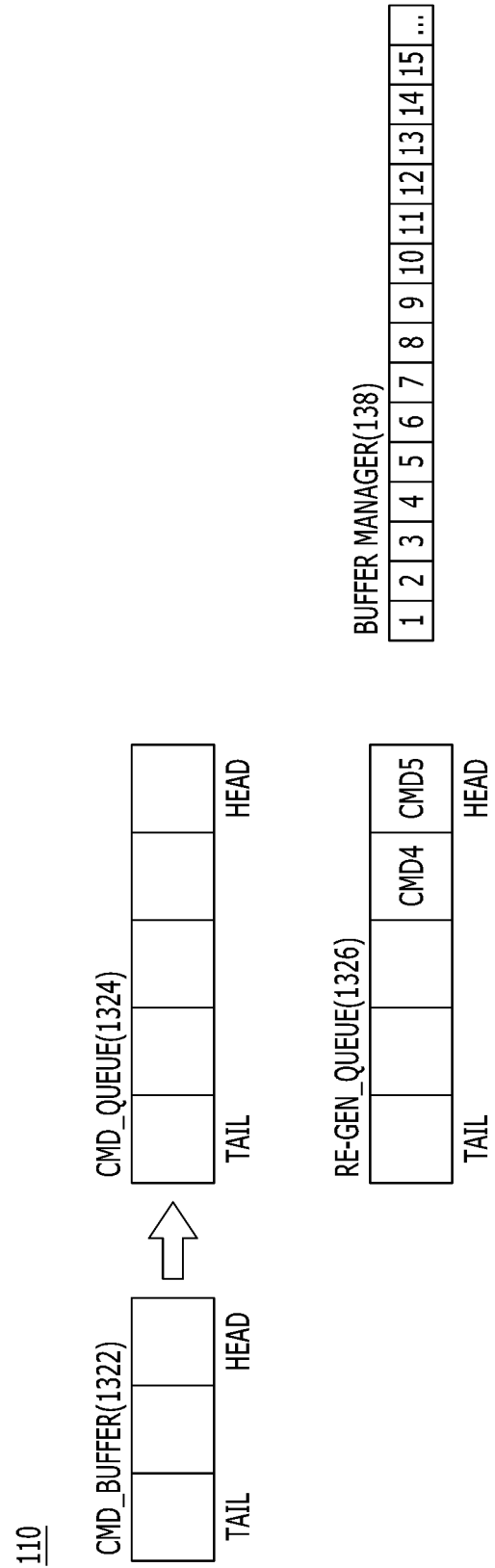
Figure 3E:
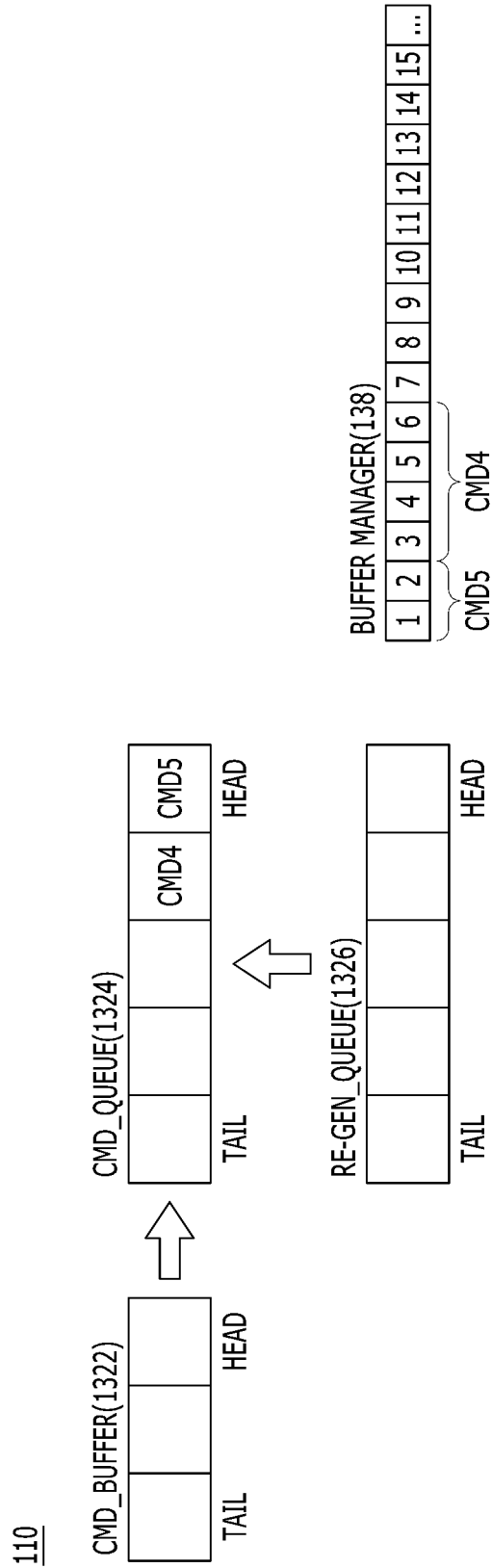
Figure 4:
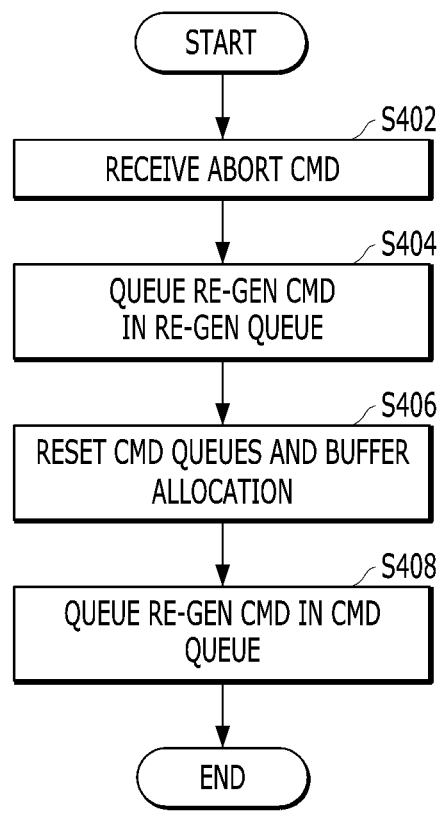
FIG. 4 is a flowchart illustrating an operation of a memory system in accordance with an embodiment of the present invention.

FIGS. 3A to 4 illustrate an operation of the memory system 110 in accordance with an embodiment of the present invention.

FIG. 3A shows the state of memory system 110 before receiving an abort command. FIG. 3A illustrates the states of the command buffer 1322, the command queue 1324, the re-generation queue 1326, and the buffer manager 138 that are included in the memory system 110. In FIG. 3A, other constituent elements that may form the memory system 110 are omitted.

FIG. 3A shows the head and tail of each of the command buffer 1322, the command queue 1324, and the re-generation queue 1326. Commands may be queued from head to tail in each queue or buffer.

The host processor 1328 may adjust the order among commands in such a manner that the command having the highest priority among the commands queued in the command queue 1324 is processed first. The host processor 1328 may sequentially process the command that is queued at the head of the command queue 1324.

FIG. 3A illustrates a state in which the first to fourth commands CMD1 to CMD4 are queued in the command queue 1324. When the CMD1 to CMD4 are buffered in the command buffer 1322, the host processor 1328 may acquire these commands and queue CMD1 to CMD4 in the command queue 1324. In this example, once CMD1 to CMD4 are acquired from the command buffer 1322 and queued in the command queue 1324, the command buffer 1322 may become empty. CMD1 to CMD4 may be queued in the order indicated by their numerical identifiers, i.e., from CMD1 to CMD4, and the corresponding operations may be performed in that order. CMD1 to CMD4 may be normal commands.

The buffer manager 138 may allocate a data buffer (or area therein) for a command queued in the command queue 1324. For example, the data buffer may include a plurality of buffer areas. The buffer manager 138 may map an index to each of the buffer areas. FIG. 3A illustrates that the buffer manager 138 has 15 buffer areas identified by $1^{st}$ to $15^{th}$ indices respectively. The buffer manager 138 may determine which indexed buffer area(s) currently store data. The buffer manager 138 may allocate one or more buffer areas in which no data are stored in order to temporarily store data associated with a command. FIG. 3A illustrates a state in which the buffer manager 138 allocates buffer areas corresponding to the first to fourth indices and storing no data for the first command CMD1. The buffer manager 138 may pre-allocate buffer areas corresponding to fifth to eighth indices for CMD2 even before a first command process associated with CMD1 is completed to improve the operation performance of the memory system 110. Similarly, the buffer manager 138 may pre-allocate buffer areas corresponding to ninth through $12^{th}$ indices for a third command.

The re-generation queue 1326 may be empty at this time.

FIG. 4 is a flowchart describing an operation of the memory system 110 in accordance with an embodiment of the present invention.

In step S402, the command buffer 1322 may receive an abort command from the host 102.

FIG. 3B is a diagram illustrating a state change of the memory system 110 according to step S402. As in FIG. 3A, for clarity, FIG. 3B illustrates only those constituent elements of the memory system 110 pertinent to the processing described in connection with FIG. 4, i.e., the command buffer 1322, the command queue 1324, the re-generation queue 1326, and the buffer manager 138.

FIG. 3B illustrates a state in which an abort command ABORT_CMD2&3 for CMD2 and CMD3 is buffered in the command buffer 1322.

The host processor 1328 may queue the abort command ABORT_CMD2&3 in the command queue 1324. ABORT_CMD2&3 may be processed with a higher priority than a normal command (i.e., any of CMD1 to CMD4). The host processor 1328 may adjust the order in which the commands are queued in the command queue 1324 so that a command having a high priority is performed first. FIG. 3B illustrates a state where ABORT_CMD2&3 is queued ahead of CMD1.

CMD1 may be being processed when ABORT_CMD2&3 is queued. For example, when CMD1 is a write command, the host processor 1328 may queue ABORT_CMD2&3 while a portion of write data corresponding to CMD1 (or sub-command(s) thereof) is received from the host 102 and buffered in a buffer. As another example, when CMD1 is a read command, the host processor 1328 may queue ABORT_CMD2&3 while a portion of read data corresponding to CMD1 (or sub-command(s) thereof) is read from the memory device 150 and buffered in the buffer. FIG. 3B illustrates a state in which a portion of data associated with CMD1 (or sub-command(s) thereof) is received and buffered in the buffer areas corresponding to the first and second indexes when ABORT_CMD2&3 is being queued. In FIG. 3B, the buffer areas in which data are buffered are shown with perimeter shading.

In step S404, a re-generated command corresponding to a remaining command of the command queue 1324 may be queued into the re-generation queue 1326.

FIG. 3C illustrates the state of the memory system 110 after the operation of step S404 is performed. Referring to FIG. 3C, ABORT_CMD2&3 for CMD2 and CMD3 that are queued at the head of the command queue 1324 may be executed first. The host processor 1328 may stop normal command processing and perform an abort process in response to ABORT CMD2&3.

In the example of FIG. 3C, the host processor 1328 may stop the operation of buffering data associated with CMD1. The host processor 1328 may process a portion of the operations instructed by CMD1 based on data that are already buffered. Processing a portion of a command (i.e., at least one sub-commands of the command) may mean performing a command operation on only a portion of the data associated with the command.

The host processor 1328 may queue a re-generated command corresponding to CMD1 and CMD4, which are remaining commands, into the re-generation queue 1326. The re-generated command and the remaining commands may be the same as or different from each other. For example, when retention remaining command has not been processed yet, the host processor 1328 may queue the remaining command as a re-generated command into the re-generation queue 1326. When retention remaining command has been only partially processed, the host processor 1328 may generate a re-generated command corresponding to the unprocessed portion (i.e., the sub-command(s) that have not been executed) of the remaining command and queue the re-generated command into the re-generation queue 1326. For example, the host processor 1328 may receive an abort command while receiving 96*kb* of data in response to a write command to write 128*kb* data from the host 102. On the side of host 102, a portion of the write command corresponding to the received 96*kb* data is a processed portion or processed sub-command. On the other hand, a portion of the write command corresponding to remaining 32*kb* data is the unprocessed portion or unprocessed sub-command. The host processor 1328 may provide the FTL processor 134 with write command corresponding to the received 96*kb* data, generate re-generated command corresponding to the remaining 32*kb* data and queue the re-generated command in response to the abort command.

An example of an operation in which the host processor 1328 processes a portion (i.e., sub-commands) of a command and generates a re-generated command corresponding to the unprocessed portion (i.e., the unprocessed or unexecuted sub-commands) of the command is described below.

A normal command may include the size and address information of data to be stored in the memory device 150 or to be provided to the host 102. For example, CMD1 may be associated with data of four logical addresses from a logical address '100'. For example, assuming that a buffer area corresponding to one index is capable of buffering data represented by one logical address, data respectively corresponding to logical addresses '100', '101', '102' and '103' may be buffered in first to fourth buffer areas. In the example of FIG. 3C, data corresponding to the logical addresses '100' and '101' may be already buffered.

The host processor 1328 may process a portion (i.e., one or more sub-commands) of CMD1 based on the data that are already buffered before the re-generated command corresponding to CMD1 is generated. For example, when CMD1 is a write command, the host processor 1328 may provide a write command to an FTL processor 134 to program the data corresponding to the logical addresses '100' and '101' in the memory device 150. When CMD1 is a read command, the host processor 1328 may provide the data corresponding to the logical addresses '100' and '101' to the host 102.

The host processor 1328 may also have to process the unprocessed portion (i.e., the unprocessed sub-command(s)) of CMD1 after the abort process of CMD2 and CMD3 is completed to ensure atomicity for CMD1. The host processor 1328 may generate a fifth command CMD5 instructing to write data for two logical addresses starting from the logical address '102' and queue CMD5 in the re-generation queue 1326. CMD5 is a re-generated command and may correspond to CMD1, which is a remaining command.

CMD4, which is a remaining command, is not entirely processed yet. The host processor 1328 may queue CMD4 as a re-generated command in the re-generation queue 1326.

In step S406, the host processor 1328 may reset the command queue 1324 and the buffer allocations of the buffer manager 138.

FIG. 3D illustrates the state of the memory system 110 after the operation of the step S406 is performed.

The host processor 1328 may remove all commands queued in the command queue 1324. The host processor 1328 may remove information associated with the buffer allocation of the buffer manager 138. Referring to FIG. 3D, information representing that a buffer is allocated to CMD1 to CMD3 may be removed.

Although not shown in detail in FIG. 3D, a command currently being processed may be an abort target command. The host processor 1328 may remove buffer allocation and the data of the allocated buffer area even when at least a portion of the data associated with one or more sub-commands of the command is buffered in a buffer. Therefore, when the abort target command is currently being processed, the atomicity of the memory system 110 may be ensured by completely aborting the command.

By the operation of step S406, CMD2 and CMD3 queued in the command queue 1324 may be aborted. In step S406, CMD1 and CMD4 may also be removed from the command queue 1324.

In step S408, the host processor 1328 may queue the re-generated commands CMD4 and CMD5 queued in the re-generation queue 1326 into the command queue 1324. The host processor 1328 may ensure the atomicity for CMD1 and CMD4 by processing CMD4 and CMD5 which are queued in the command queue 1324.

FIG. 3E is a diagram illustrating a state of the memory system 110 after the operation of step S408 is performed.

FIG. 3E illustrates a state where CMD4 and CMD5 are queued in the command queue 1324. CMD5 may be a re-generated command corresponding to CMD1, and may be processed first by the host processor 1328 because it is queued ahead of CMD4.

FIG. 3E illustrates a state in which the buffer manager 138 allocates a buffer area for CMD4 and CMD5. A buffer area corresponding to the first and second indexes may be allocated for CMD5, and a buffer area corresponding to the third to sixth indexes may be allocated for CMD4. In the example of FIG. 3C, CMD5 may be a command associated with two logical addresses from the logical address '102'.

For example, when CMD1 is a write command, the host processor 1328 may receive data corresponding to the logical addresses '102' and '103' from the host 102 in response to CMD5 and provide a command to the FTL processor 134 so that the memory device 150 may write the data. When CMD1 is a read command, the host processor 1328 may control the FTL processor 134 to read the data corresponding to the logical addresses '102' and '103' based on CMD5 and provide the read data to the host 102. Since CMD5 corresponding to the unprocessed portion (i.e., unprocessed sub-command(s)) of CMD1 is processed, the processing of CMD1 may be completed.

According to an embodiment of the present invention, the host processor 1328 may queue the re-generated command corresponding to the remaining command into the re-generation queue 1326 in response to the abort command ABORT_CMD2&3, and reset the command queue and buffer allocation information. The host processor 1328 may abort the abort target command by collectively resetting the command queue and the buffer allocation information. The host processor 1328 may not have to perform a complicated operation for removing only the abort target command among the commands that are queued in the command queue 1324 and the lower queue. Similarly, the buffer manager 1328 may not have to perform any separate processing on the buffer area allocated for the abort target command. Thus, the time taken for the abort processing of the memory system 110 may be shortened, and the complexity of the implementation of the memory system 110 may be reduced.

According to embodiments of the present invention, it is possible to ensure rapid processing of an abort command for a command queued inside the controller.

While the present invention has been described with respect to the specific embodiments, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A controller for controlling a memory device, comprising:
   a command queue configured to queue two or more commands received from a host;
   a re-generation queue configured to queue, in response to an abort command for aborting an abort-target command, a re-generated command corresponding to a remaining command other than the abort-target command among the commands queued in the command queue; and
   a processor configured to reset the command queue when queuing a command into the re-generation queue is completed, and queue the re-generated command into the command queue.

2. The controller of claim 1, further comprising: a data buffer configured to buffer write data to be written into the memory device and buffer read data read from the memory device.

3. The controller of claim 2, wherein the processor resets the data buffer in response to the abort command.

4. The controller of claim 2, wherein the processor processes a portion of the remaining command in response to the abort command when a portion of data associated with the portion of the remaining command is buffered in the data buffer.

5. The controller of claim 4, wherein the processor generates the re-generated command instructing processing of an unprocessed portion of the remaining command.

6. The controller of claim 5, wherein when the remaining command is a write command, the processor processes the portion of the remaining command by controlling the memory device to store the portion of data.

7. The controller of claim 5, wherein when the remaining command is a read command, the processor processes the portion of the remaining command by providing the host with the portion of data.

8. The controller of claim 1, wherein the command queue processes the abort command with a higher priority than any command queued in the command queue.

9. A method for operating a controller controlling a memory device, comprising:
   queuing two or more commands received from a host in a command queue;
   queuing, in response to an abort command for aborting an abort-target command, a re-generated command corresponding to a remaining command other than the abort-target command among the commands queued in the command queue, in a re-generation queue;
   determining completion of queuing of a command into the re-generation queue;
   resetting the command queue in response to the determination of completion of queuing of the command into the re-generation queue; and
   queuing the re-generated command into the command queue.

10. The method of claim 9, further comprising: determining that a portion of data associated with a portion of the remaining command is buffered n an internal buffer of the controller; processing the portion of the remaining command in response to the abort command and the determination that the portion of data associated with the portion of the remaining command is buffered in the internal buffer of the controller.

11. The method of claim 10, further comprising: generating the re-generated command instructing processing of an unprocessed portion of the remaining command.

12. The method of claim 10, further comprising: resetting the internal buffer in response to the abort command.

13. The method of claim 10, wherein the processing of the portion of the remaining command in response to the abort command includes: determining that the remaining command is a write command; and controlling the memory device to store the portion of data in response to the determination that the remaining command is a write command.

14. The method of claim 10, wherein the processing of the portion of the remaining command in response to the abort command includes: determining that the remaining command is a read command; and providing the host with the portion of data in response to the determination that the remaining command is a read command.

15. An operating method of a controller, the operating method comprising:
   queueing first and second commands in a command queue;
   generating, in response to an abort command for the second command, a third command including one or more sub-commands of the first command;
   queuing the third command in a re-generation queue;
   removing the first and second commands from the command queue;
   queuing the third command into the command queue from the re-generation queue; and
   controlling a memory device to perform an operation according to the third command in the command queue.

* * * * *